(12) United States Patent  
Wu

(10) Patent No.: US 7,271,402 B1
(45) Date of Patent: Sep. 18, 2007

(54) OPTICAL MODULE AND METHODS FOR OPTICALLY ALIGNING AND ASSEMBLING THE SAME

(75) Inventor: Ming-Che Wu, Chia-Yi (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 11/728,561

(22) Filed: Mar. 26, 2007

(51) Int. Cl.
*H01J 40/14* (2006.01)
*H04N 1/04* (2006.01)
*G03G 13/04* (2006.01)
*B41J 2/45* (2006.01)

(52) U.S. Cl. ............... 250/553; 250/208.1; 347/130; 347/138; 347/238; 347/242; 358/472

(58) Field of Classification Search ............ 250/208.1, 250/552, 553; 347/130, 138, 238, 242, 256–258; 358/472
See application file for complete search history.

(56) References Cited

U.S. PATENT DOCUMENTS 6,169,564 B1 * 1/2001 Tsukagoshi et al. ........ 347/238
6,340,982 B1 * 1/2002 Taira et al. ................. 347/130
6,952,289 B1 * 10/2005 Fujimoto et al. ........... 358/472

* cited by examiner

*Primary Examiner*—John R. Lee
(74) *Attorney, Agent, or Firm*—Ladas and Parry LLP

(57) ABSTRACT

An optical alignment method is for an optical module including a housing unit, a light-sensing unit, and a lens unit. The method includes: (a) through image-capturing techniques, finding a light-sensing component of the light-sensing unit and a predetermined reference point, and determining an actual total optical path length between the light-sensing component and an object position; (b) subtracting a correction distance from the actual total optical path length to obtain a corrected total optical path length; (c) finding a first center line that divides the corrected total optical path length in half; (d) through image-capturing techniques, finding opposite first and second edges of the lens unit, and determining a lens length between the first and second edges; (e) finding a second center line that divides the lens length in half; and (f) assembling the lens unit to the housing unit such that the first and second center lines overlap.

17 Claims, 12 Drawing Sheets

OPTICAL MODULE AND METHODS FOR OPTICALLY ALIGNING AND ASSEMBLING THE SAME

BACKGROUND OF THE INVENTION

1. Field of the Invention

The invention relates to an optical module. More particularly, the present invention relates to an optical module that is capable of sensing images, and to methods for optically aligning and assembling optical components of the optical module.

2. Description of the Related Art

As shown in FIG. 1, a conventional optical module 1 for an optical input device, such as a scanner, mainly includes a housing unit 11, a light-sensing unit 12, a lens unit 13, and a light-emitting unit 14. The housing unit 11 includes an outer housing 111 and a base 112 coupled to the outer housing 111. The outer housing 111 is formed with a groove 113. The light-sensing unit 12 includes a plurality of light-sensing components 121 aligned on top of the base 112. Each of the light-sensing components 121 is a Complementary Metal Oxide Semiconductor (CMOS) image sensor scanner. The lens unit 13 is embedded in the groove 113 in the outer housing 111 at a position that corresponds to the light-sensing unit 12. The light-emitting unit 14 is disposed in the outer housing 111 at a position corresponding to a glass platform 21, and includes a plurality of light-emitting diodes (LEDs) 141. When the light-emitting diodes 141 provide source light toward an object disposed on the glass platform 21, the source light is refracted, and the refracted light travels through the lens unit 13 along a Z-axis direction toward the light-sensing components 121 so as to be focused into an image. At this time, the light-sensing components 121 sense the light impinged thereon and captures an image of the object.

Since precision of the focus of light onto the light-sensing components 121 is the key to determining the resolution of the above mentioned optical input device, optical alignment between the light-sensing unit 12 and the lens unit 13 needs to be highly precise. Currently, the outer housing 111, the base 112, and the light-sensing unit 12 are assembled in advance. Subsequently, the lens unit 13 is mounted in the groove 113, whose depth is predefined, according to a theoretical value in order to define the relative locations of the lens unit 13 and the light-sensing unit 12. Lastly, the lens unit 13 is secured to the base 112 by means of an adhesive to finish the alignment and assembly of the conventional optical module. However, due to cost considerations, the lens unit 13 of the conventional optical module 1 is mostly assembled manually into the groove 113, while neglecting the tolerance of an optical length of the lens unit 13, which is approximately 400 micron. In addition, the relative positions of the lens unit 13 and the light-sensing unit 12 are mainly determined by the depth of the groove 113 and the optical length of the lens unit 13. Therefore, an overly large tolerance usually leads to optical misalignment, which results in over focus or under focus of the conventional optical module 1 such that the resolution thereof is degraded.

SUMMARY OF THE INVENTION

Therefore, the object of the present invention is to provide an optical module and methods for optically aligning and assembling the same with improved alignment precision so as to result in an enhanced optical resolution of the optical module.

According to one aspect of the present invention, there is provided an optical alignment method for an optical module that includes a housing unit, a light-sensing unit disposed in the housing unit, and a lens unit for focusing light onto the light-sensing unit. The optical alignment method includes the steps of:

(a) through image-capturing techniques, finding a light-sensing component of the light-sensing unit and a predetermined object reference point, and determining an actual total optical path length between the light-sensing component and an object position having a predetermined distance relation with the predetermined object reference point;

(b) subtracting a correction optical distance from the actual total optical path length to obtain a corrected total optical path length;

(c) finding an imaginary first center line located at a position that divides the corrected total optical path length into equal half distances;

(d) through image-capturing techniques, finding first and second edges of the lens unit that are opposite to each other in a direction of a light-sensing axis of the light-sensing unit from the light-sensing component to the object position, and determining a lens length between the first and second edges;

(e) finding an imaginary second center line located at a position that divides the lens length into equal half distances; and (f) assembling the lens unit to the housing unit in such a manner that the imaginary second center line coincides with the imaginary first center line.

According to another aspect of the present invention, there is provided an optical module that includes a light-sensing unit, a housing unit, and a lens unit. The light-sensing unit includes at least one light-sensing component that is capable of sensing light along a light-sensing axis. The light-sensing unit is disposed in the housing. The housing is formed with a slot located on a plane parallel to the light-sensing axis. The lens unit is disposed in the housing unit for focusing light onto the light-sensing component. The lens unit has opposite first and second edges intersected by the light-sensing axis.

The slot in the housing unit permits use of image-capturing techniques to find the light-sensing component and a predetermined object reference point for determining an actual total optical path length between the light-sensing component and an object position having a predetermined distance relation with the predetermined object reference point.

An imaginary first center line located at a position that divides a corrected total optical path length, which is obtained by subtracting a correction optical distance from the actual total optical path length, into equal half distances is coincident with an imaginary second center line located at a position that divides a lens length between the first and second edges of the lens unit into equal half distances.

According to yet another aspect of the present invention, there is provided an assembly method for an optical module that includes a light-sensing unit including a light-sensing component capable of sensing light along a light-sensing axis, a housing unit formed with a slot, and a lens unit having opposite first and second edges. The assembly method includes the steps of:

(a) mounting the light-sensing unit in the housing unit such that the slot is on a plane parallel to the light-sensing axis;

(b) through image-capturing techniques and via the slot in the housing unit, finding the light-sensing component and a predetermined object reference point, and determining an actual total optical path length between the light-sensing component and an object position having a predetermined distance relation with the predetermined object reference point;

(c) subtracting a correction optical distance from the actual total optical path length to obtain a corrected total optical path length;

(d) finding an imaginary first center line located at a position that divides the corrected total optical path length into equal half distances;

(e) through image-capturing techniques, finding the first edge and the second edge of the lens unit, and determining a lens length between the first and second edges;

(f) finding an imaginary second center line located at a position that divides the lens length into equal half distances; and (g) assembling the lens unit to the housing unit via the slot in such a manner that the light-sensing axis passes through the lens unit and that the imaginary second center line coincides with the imaginary first center line.

BRIEF DESCRIPTION OF THE DRAWINGS

Other features and advantages of the present invention will become apparent in the following detailed description of the preferred embodiment with reference to the accompanying drawings, of which:

FIG. 5-1 and FIG. 5-2 respectively illustrate changes in an object distance of a lens unit and corresponding variations in modulation transfer function (MTF) values;

FIG. 6-1 and FIG. 6-2 respectively illustrate changes in relative positioning between the lens unit and a light-sensing unit and corresponding variations in MTF values;

FIG. 7-1 and FIG. 7-2 respectively illustrate maintaining of an actual total optical path length within a predetermined range when a ½ (ZO) position is coincident with a ½ (TC) position in accordance with the present invention, and corresponding variations in MTF values with any change in the actual total optical path length position;

DETAILED DESCRIPTION OF THE PREFERRED EMBODIMENT

Figure 2:
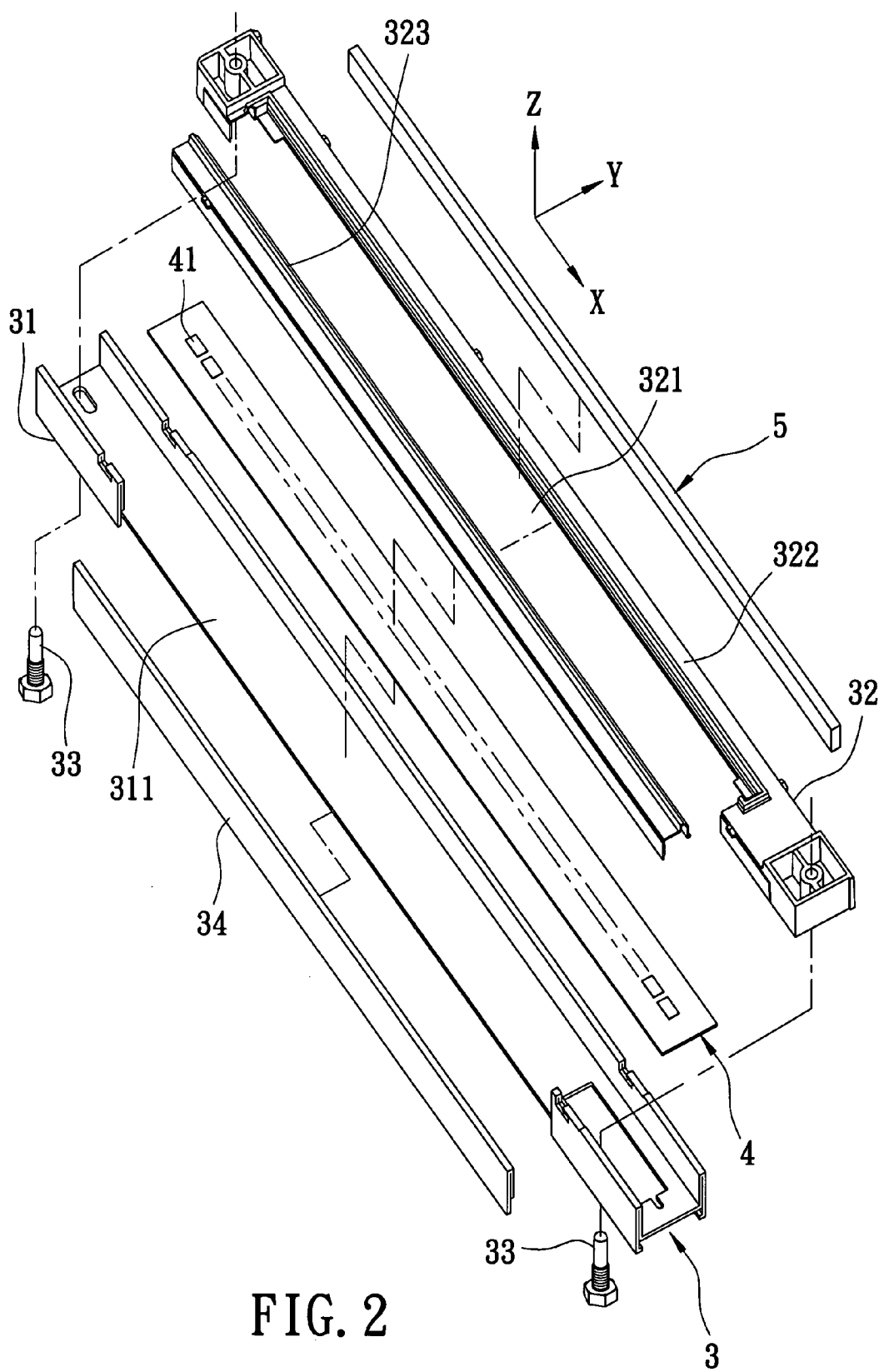
FIG. 2 is an exploded perspective view of the preferred embodiment of an optical module according to the present invention.
Figure 3:
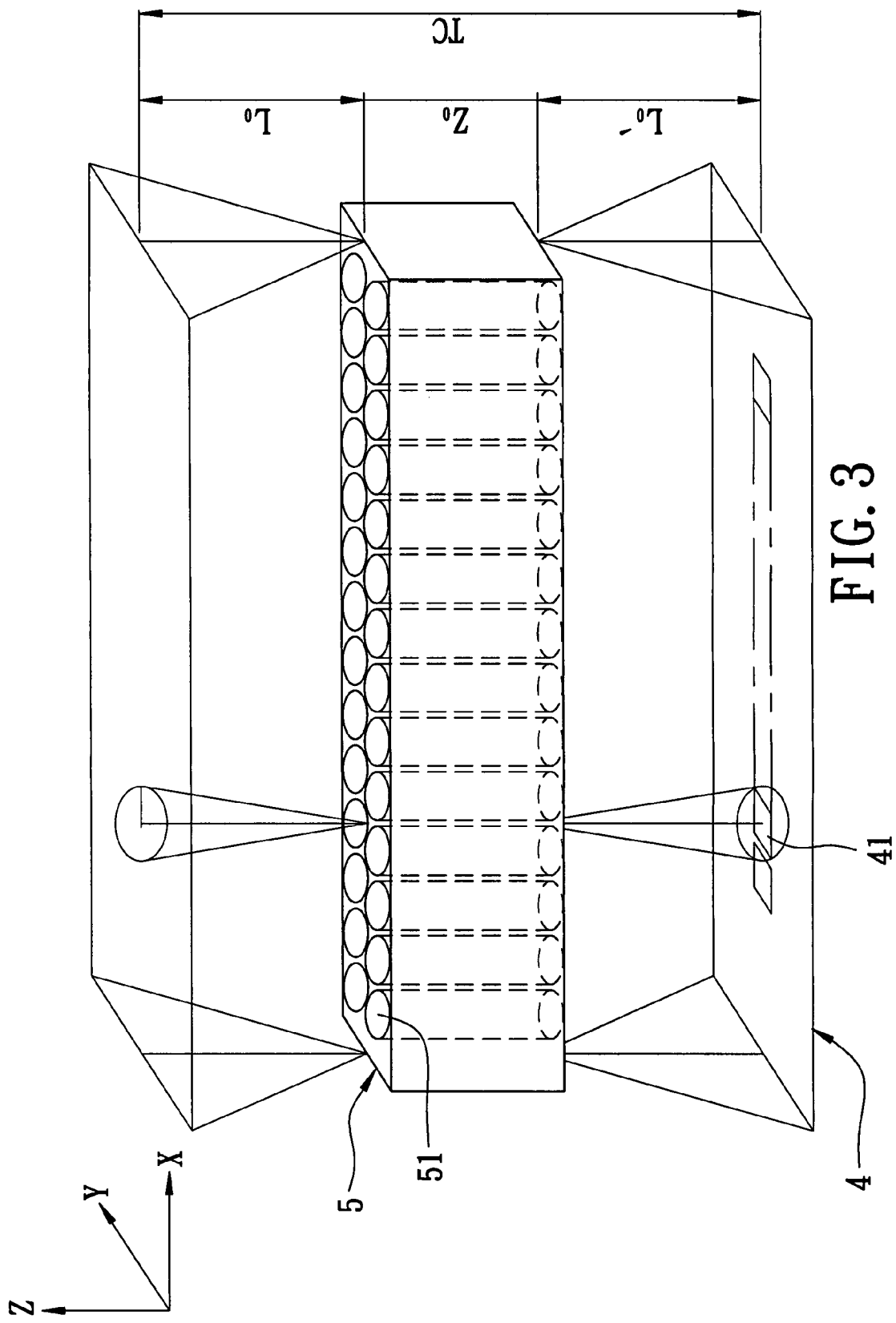
FIG. 3 is a schematic view of the preferred embodiment, illustrating distances associated with components in the optical module of FIG. 2.
Figure 12:
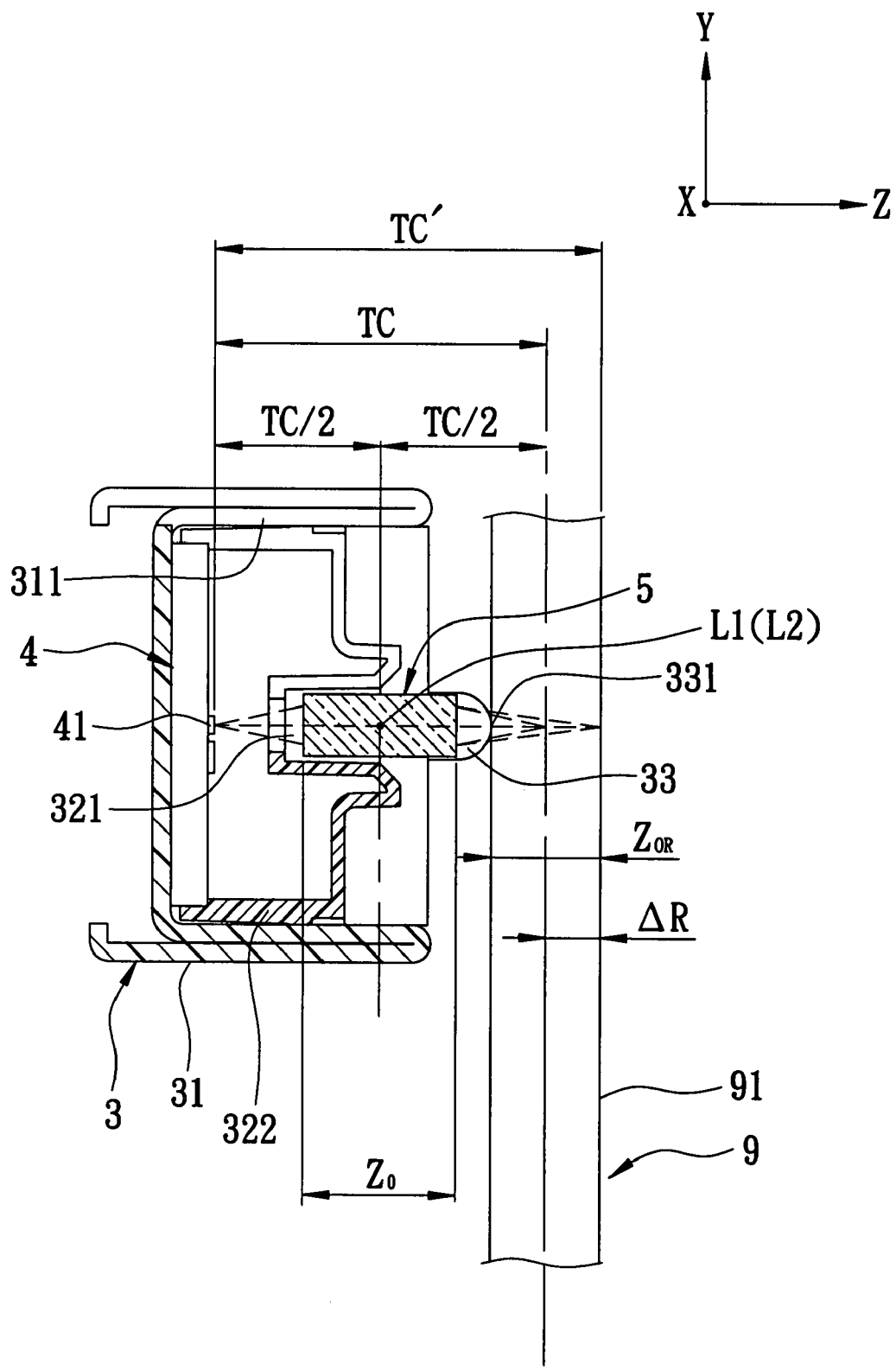
FIG. 12 is a sectional view of the preferred embodiment in an assembled state, illustrating distances associated with the alignment and assembly of the optical module.

As shown in FIG. 2 and FIG. 3, the preferred embodiment of an optical module according to the present invention is for use in an optical input device, and is disposed to correspond in position to a glass plate 9 (as shown in FIG. 12). The glass plate 9 has a top surface 91 for supporting an object (not shown). The optical module includes a housing unit 3, a light-sensing unit 4, and a lens unit 5.

The housing unit 3 includes an outer housing 31 extending along a first direction (X) and having an approximately U-shaped cross section, an inner support 32 extending along the first direction (X) and disposed in the outer housing 31, a pair of fasteners 33 for interconnecting the outer housing 31 and the inner support 32 respectively at opposite ends thereof, and a cover plate 34. The outer housing 31 is formed with a slot 311 in one side thereof, which extends along the first direction (X). The inner support 32 includes first and second members 322, 323 coupled to each other. The first and second members 322 cooperate to define a groove 321 therebetween. During assembly, the second member 323 is insertable into the outer housing 31 via the slot 311 for coupling detachably to the first member 322. The cover plate 34 covers detachably the slot 311 in the outer housing 31. In this embodiment, the fasteners 33 are adapted to abut against the glass plate 9, as illustrated in FIG. 12.

The light-sensing unit 4 is mounted to the outer housing 31, and includes a plurality of light-sensing components 41 that are arranged spacedly along the first direction (X) and that are capable of sensing light along a direction of a light-sensing axis (Z), which is perpendicular to the first direction (X). In this embodiment, each of the light-sensing components 41 is a Complementary Metal Oxide Semiconductor (CMOS) image sensor. The slot 311 in the outer housing 31 of the housing unit 3 is on a plane parallel to the direction of the light-sensing axis (Z).

The lens unit 5 is disposed in the housing unit 3 such that the light-sensing axis (Z) passes through the lens unit 5. That is, in this embodiment, the lens unit 5 is inserted in the groove 321 defined between the first and second members 322, 323 of the inner support 32, such that the inner support 32 of the housing unit 3 supports the lens unit 5 in the outer housing 31 between the light-sensing unit 4 and the glass plate 9. Referring to FIG. 3, the lens unit 5 includes a plurality of columnar lenses 51 arranged side-by-side along the first direction (X), and each having a lens axis that extends along the light-sensing axis (Z) Each of the columnar lenses 51 has a gradually changing refractive index and is capable of focusing light. A distance (object distance) ($L_0$) between an object position, from where light is incidents and where the light reaches a columnar lens 51 is substantially equal to a distance (image distance) ($L_0'$) between where the light exits the columnar lens 51 and impinges a corresponding one of the light-sensing components 41 after being focused, i.e., $L_0=L_0'$. In addition, a distance that light must travel through each of the columnar lenses 51 along the light-sensing axis (Z) is a lens length ($Z_0$). Therefore, an ideal total optical path length (TC) from where light is incident from the object position, passes through the lens unit 5, and reaches the light-sensing components 41 along the light-sensing axis (Z) is the sum of the object and image distances ($L_0$), ($L_0'$) plus the lens length ($Z_0$), that is, twice the object distance ($L_0$) plus the lens length ($Z_0$), i.e., $TC=2L_0+Z_0$.

Figure 4:
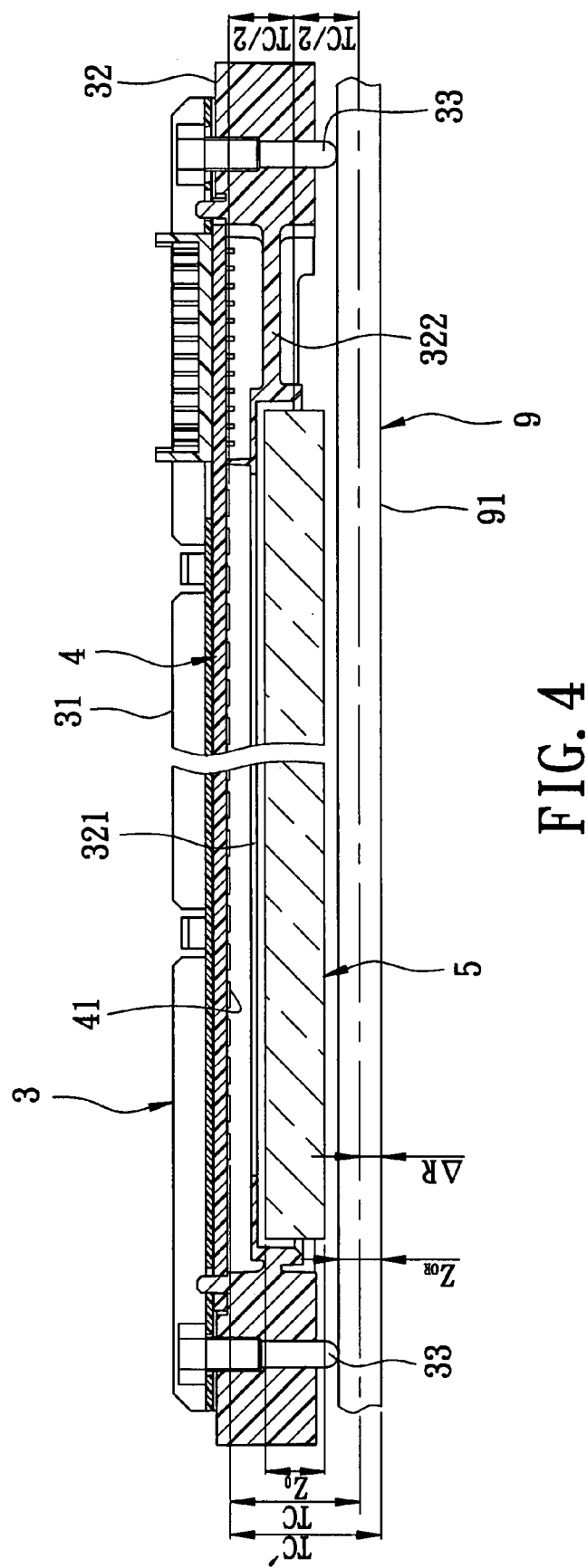
FIG. 4 is a sectional view of the preferred embodiment of FIG. 2 in an assembled state.

Referring to FIG. 3 and FIG. 4, due to variations in refractive index between the optical module and the object position, a correction optical distance ($\Delta R$) is needed to compensate for this variation in refractive index. In this embodiment, the object position is located on the top surface 91 of the glass plate 9, and therefore the correction optical distance ($\Delta R$) is for compensating the variations in refractive index between the optical module and the glass plate 9, and is obtainable from equation $\Delta R=h(1-1/n)$, where h is the thickness of the glass plate 9 and n is the refractive index of the glass plate 9. In practice, the correction optical distance ($\Delta R$) can also be obtained through a simple measurement. Therefore, an actual total optical path length (TC') is obtained by adding the correction optical distance ($\Delta R$) to the ideal total optical path length (TC), i.e., TC'=TC+$\Delta R$.

Figure 1:
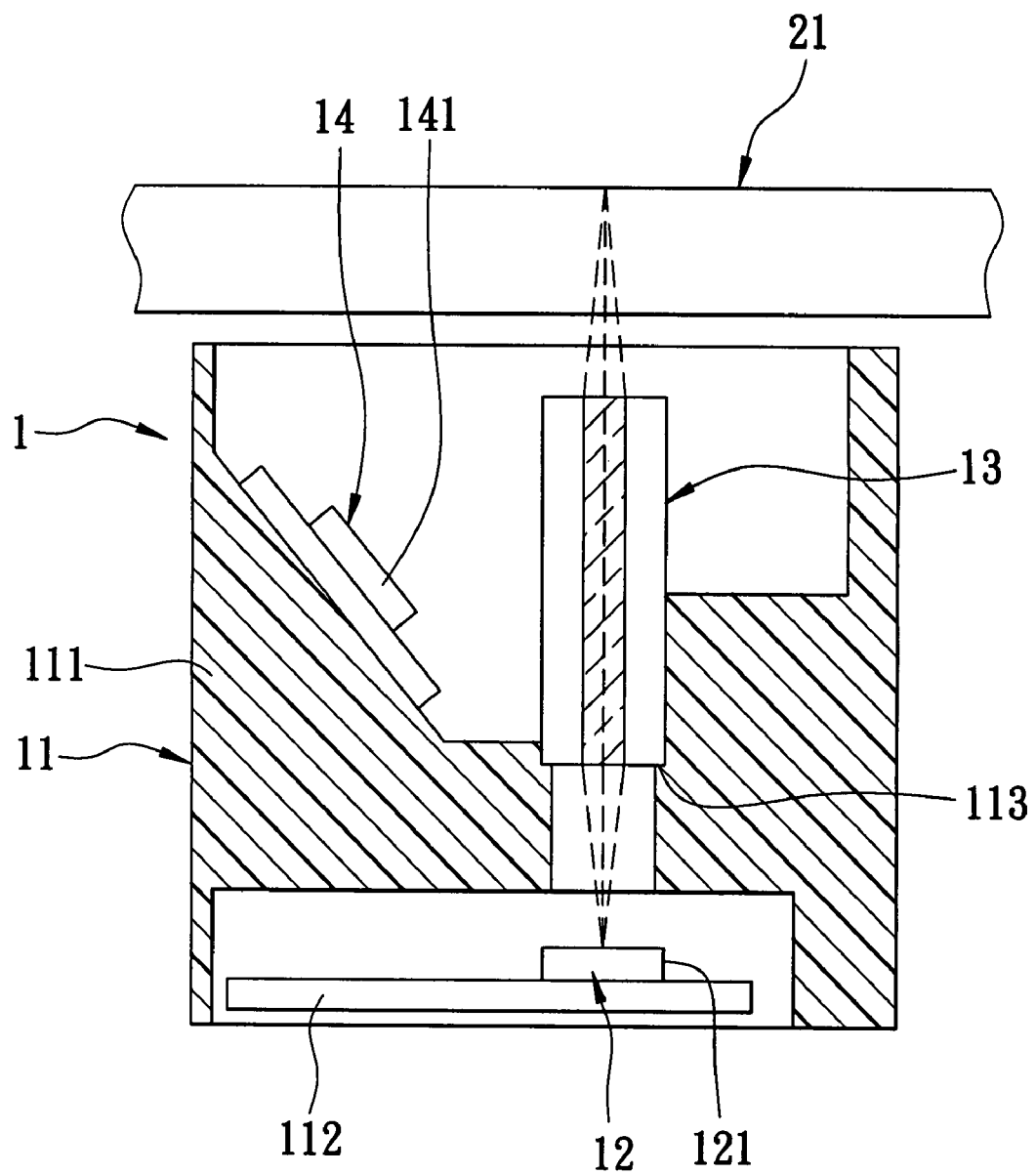
FIG. 1 is a sectional view of a conventional optical module as disclosed in U.S. Pat. No. 6,169,564.
Figures 1, 5:
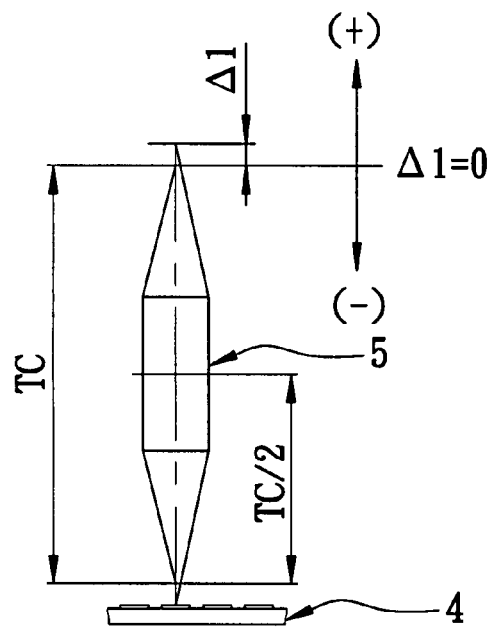
Figures 2, 5:
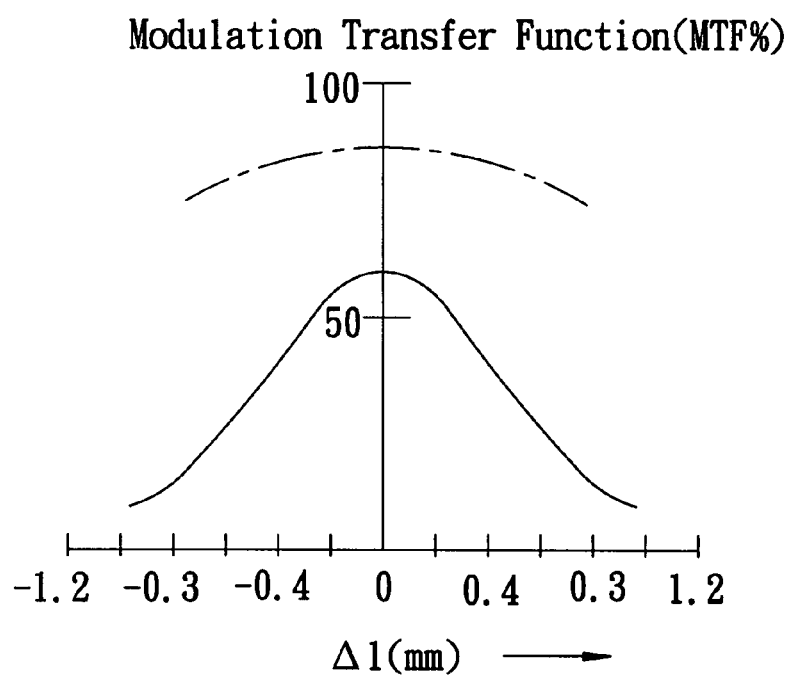
Figures 1, 6:
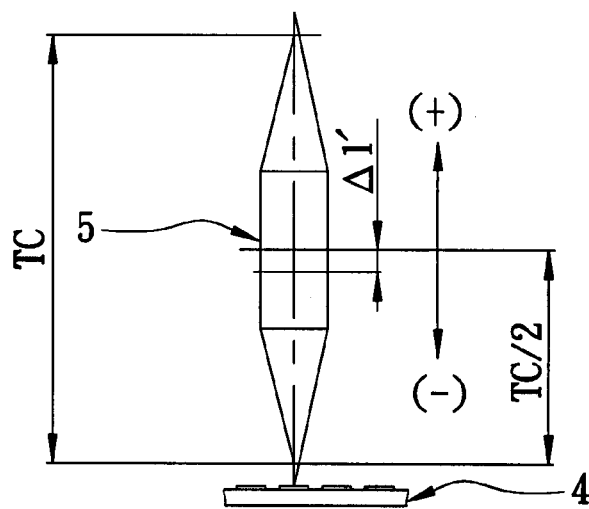
Figures 2, 6:
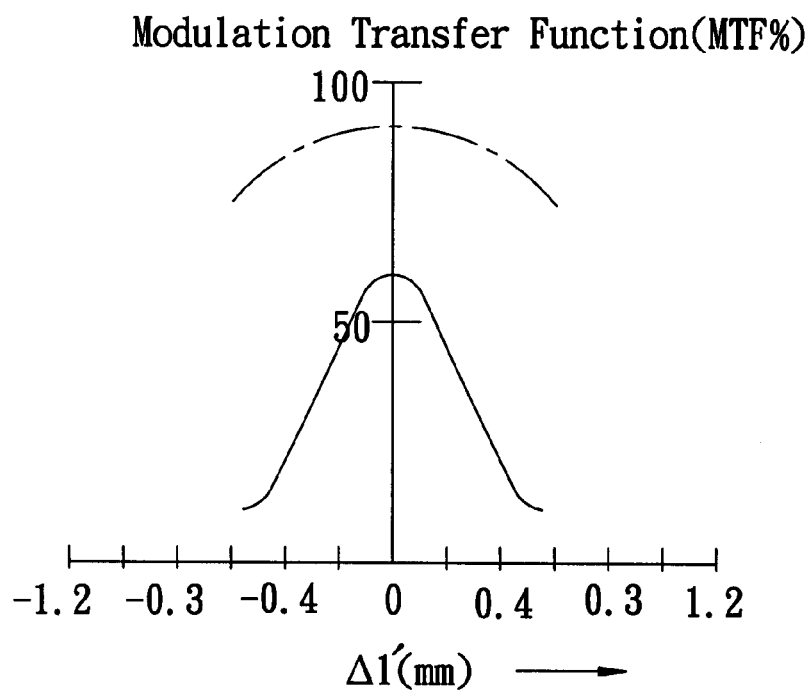
Figures 1, 7:
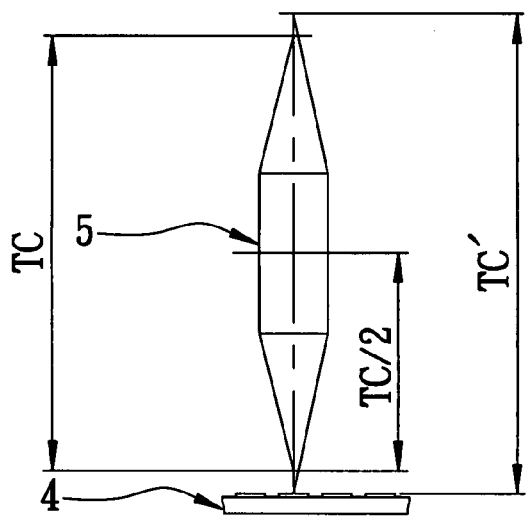
Figures 2, 7:
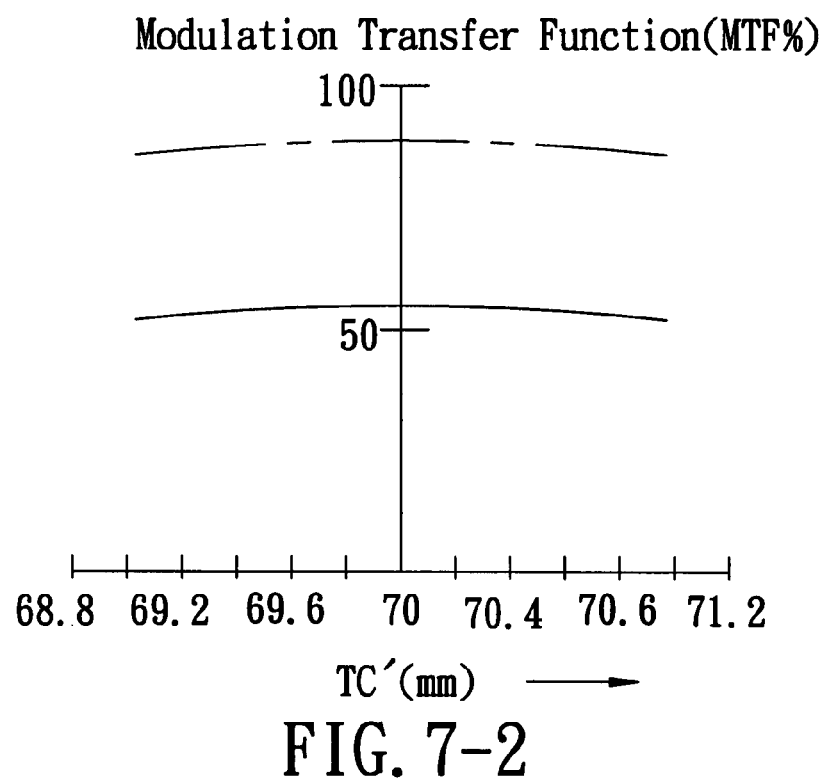

It should be noted herein that an important indicator of performance with respect to the ability of an optical module in projecting images is the modulation transfer function (MTF), which describes the ability of an optical system or element to transfer contrast. The higher the MTF(typically given in percentage), the better the imaging quality of an optical system or element. Therefore, with reference to FIGS. 3, 5-1, 5-2, 6-1, 6-2, 7-1, and 7-2, it is evident that with any slight variation in the object distance (the object position) (FIG. 5-1 and FIG. 5-2) or relative positioning between the lens unit 5 and the light-sensing unit 4 (FIG. 6-1 and FIG. 6-2), MTF (%) is significantly reduced. That is, in a conventional optical alignment process, only a slight deviation from the intended or optimal alignment position significantly reduces MTF (%). However, referring to FIG. 3, FIG. 7-1 and FIG. 7-2, if a $\frac{1}{2}(Z_0)$ position is made to coincide with a $\frac{1}{2}(TC)$ position, MTF (%) stays relatively close to ideal when variations in the actual total optical path length (TC') is within hundreds of microns such that a good optical imaging quality is maintained.

Optical alignment and assembly methods according to the preferred embodiment of the present invention will be described hereinafter.

Figure 8:
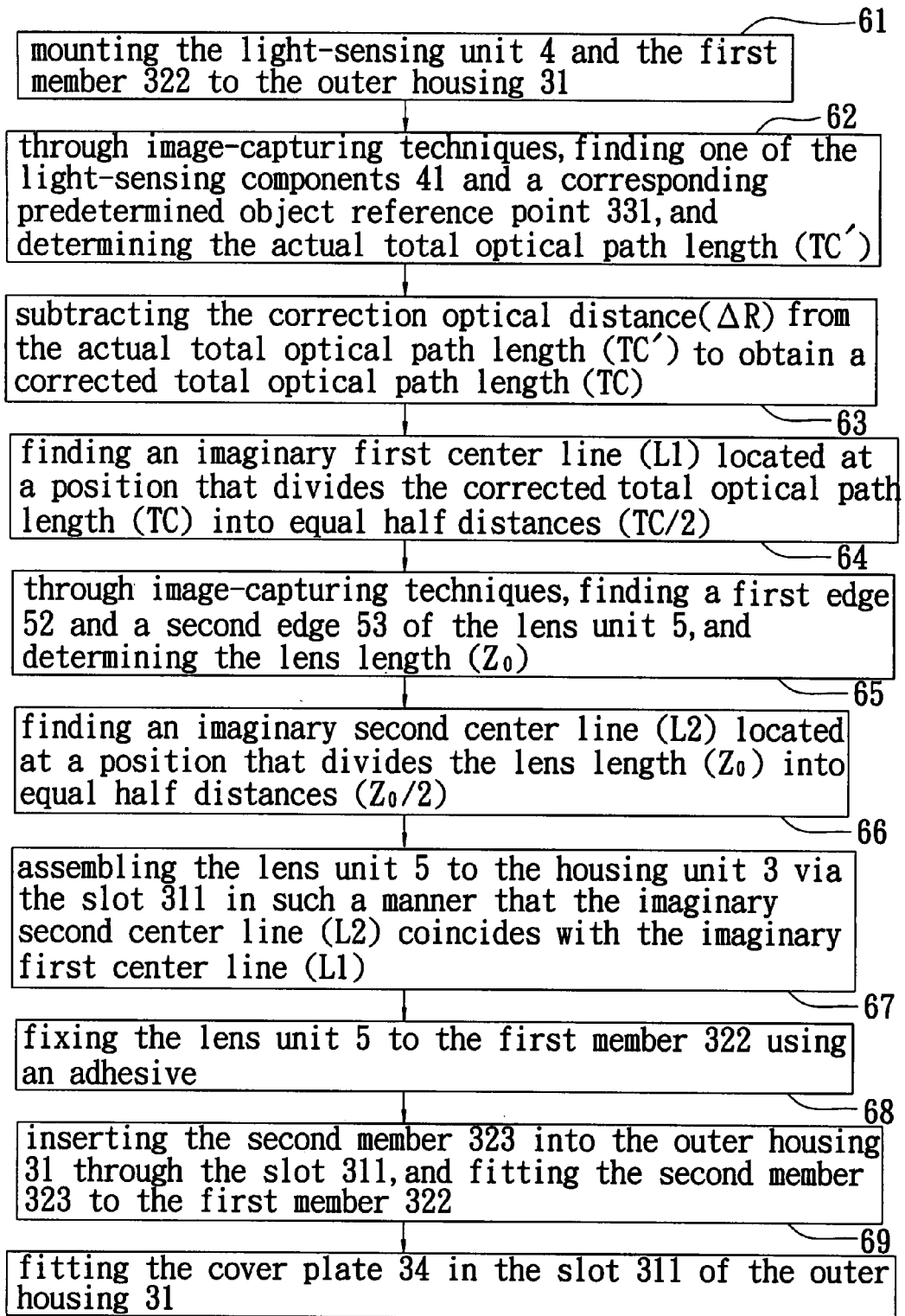
FIG. 8 is a flow chart of optical alignment and assembly processes according to the preferred embodiment of the present invention.
Figure 9:
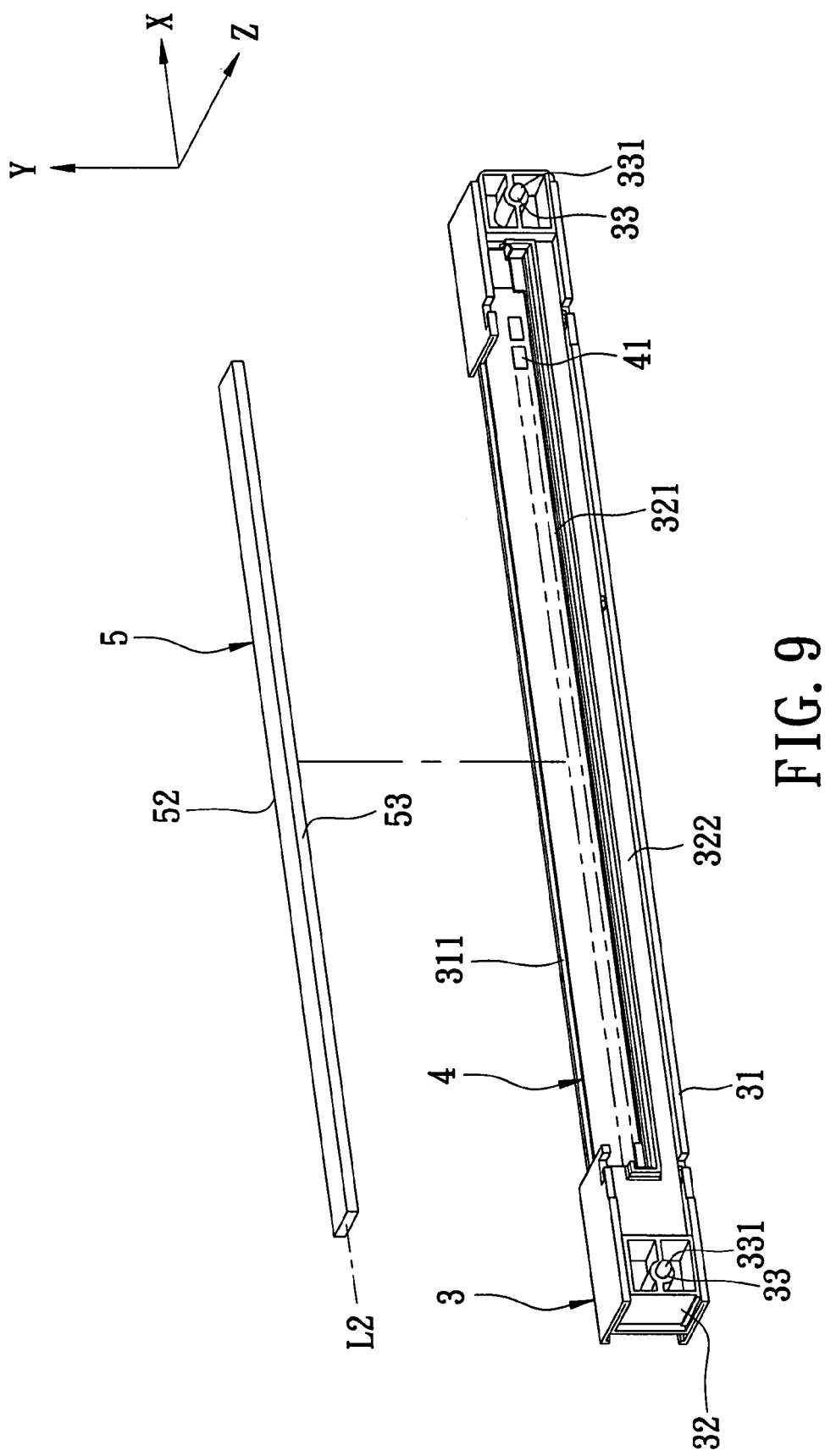
FIGS. 9 and 10 are exploded perspective views of the preferred embodiment for illustrating assembly of the optical module.

In step 61, referring to FIG. 8 and FIG. 9, the light-sensing unit 4 is mounted to the outer housing 31, after which the first member 322 of the inner support 32 is fitted within the outer housing 31, such that the light-sensing components 41 of the light-sensing unit 4 and a wall of the first member 322 defining one side of the groove 321 are exposed through the slot 311 in the outer housing 31. With the light-sensing unit 4 thus disposed, the slot 311 is on a plane parallel to the light-sensing axis (Z).

Figure 10:
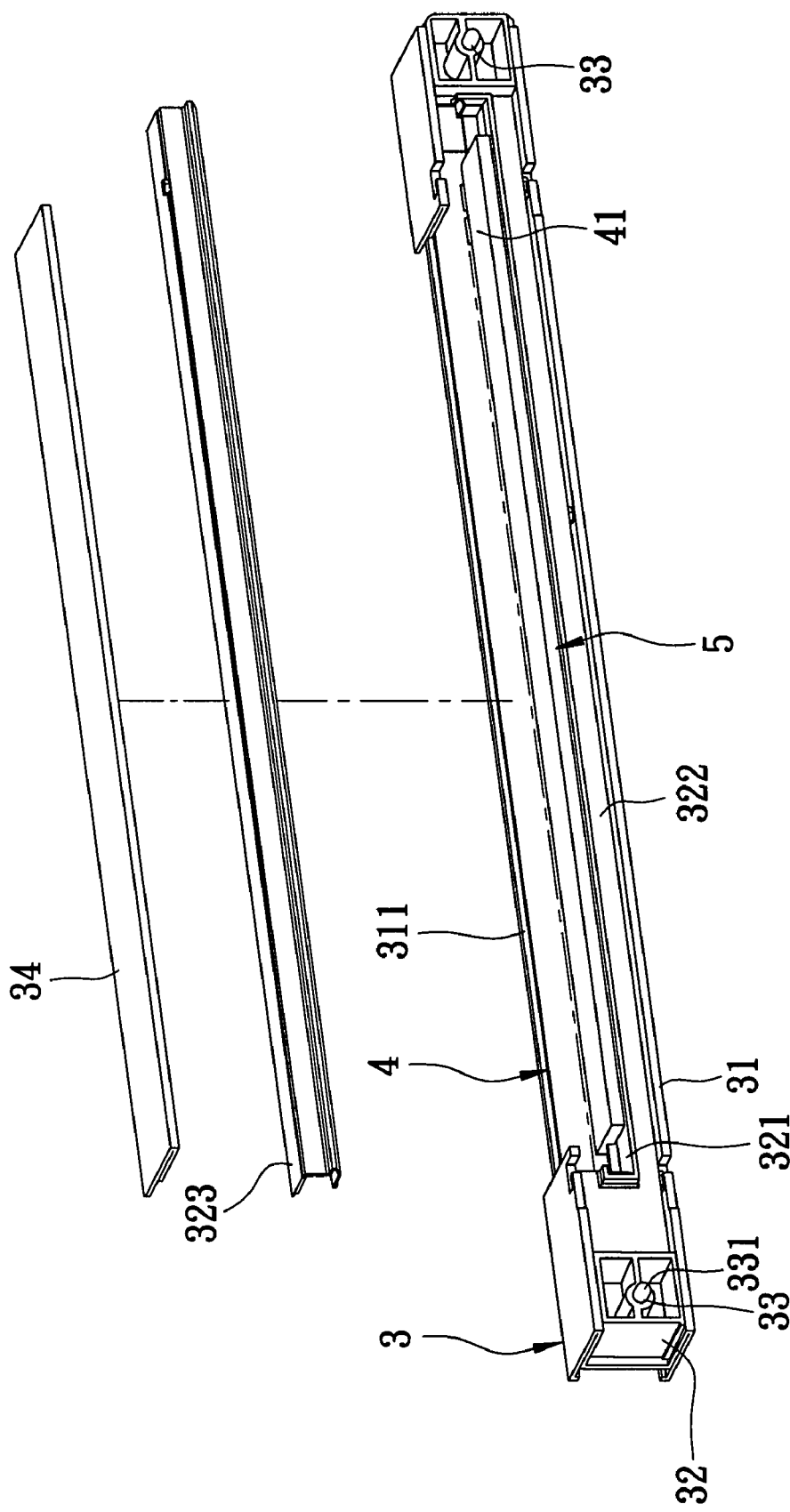

In step 62, referring to FIG. 8, FIG. 10 and FIG. 12, through image-capturing techniques and via the slot 311 in the outer housing 31, one of the light-sensing components 41 and a corresponding predetermined object reference point 331 are found, and the actual total optical path length (TC') between the light-sensing component 41 and the object position is determined. In this embodiment, charge-coupled devices (CCDs) (not shown) are used to perform image capturing, and the light-sensing component 41 and the predetermined object reference point 331 are captured using one or more CCDs through the slot 311 and along a second direction (Y), which is perpendicular to the first direction (X) and the light-sensing axis (Z). Further, in this embodiment, an end of either one of the fasteners 33 is used as the predetermined object reference point 331. Each of the fasteners 33 has a predetermined distance relation with the object position, which is located on the top surface 91 of the glass plate 9 in this embodiment. In other words, a predetermined spacing ($Z_{OR}$) is present between each of the predetermined object reference points 331 and the top surface 91 of the glass plate 9 along the direction of the light-sensing axis (Z) Therefore, the actual total optical path length (TC') from the light-sensing components 41 to the object position may be determined by adding this spacing ($Z_{OR}$) to the distance between the one of the light-sensing components 41 and the corresponding predetermined object reference point 331 obtained through use of the CCDs.

In step 63, the correction optical distance ($\Delta R$) is subtracted from the actual total optical path length (TC') to obtain a corrected total optical path length (TC), which is also referred to hereinbefore as the ideal total optical path length (TC).

In step 64, with reference to FIG. 8, FIG. 9 and FIG. 12, an imaginary first center line (L1) located at a position that divides the corrected total optical path length (TC) into equal half distances (TC/2) is found. In this embodiment, the imaginary first center line (L1) extends along the first direction (X) and intersects the opposite ends of the housing unit 3.

Next, in step 65, with reference to FIG. 8 and FIG. 9, through image-capturing techniques, a first edge 52 and a second edge 53 of the lens unit 5 are found, and the lens length ($Z_0$) between the first and second edges 52, 53 is determined. In this embodiment, charge-coupled devices (CCDs) are used to perform image capturing of the lens unit 5. Further, in this embodiment, the first and second edges 52, 53 extend along the first direction (X) and are intersected by the light-sensing axis (Z).

Figure 11:
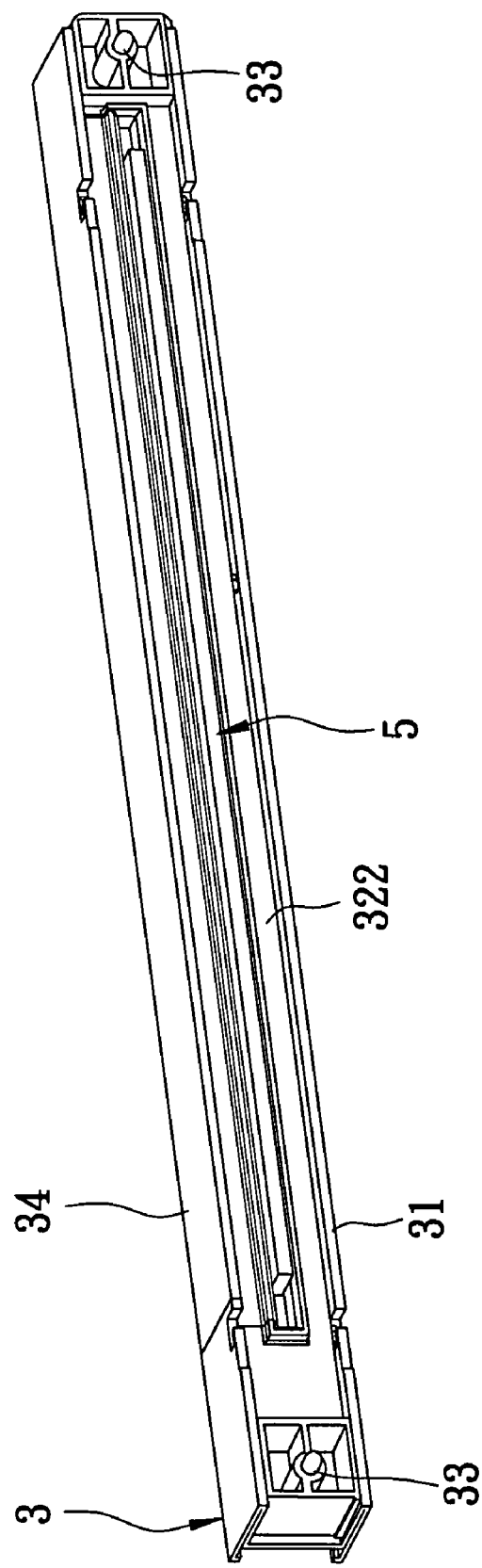
FIG. 11 is a perspective view of the preferred embodiment in a fully assembled state.

Instep 66, with reference to FIG. 9, FIG. 11 and FIG. 12, an imaginary second center line (L2) located at a position that divides the lens length ($Z_0$) into equal half distances ($Z_0/2$) is found. In this embodiment, the imaginary second center line (L2) passes through opposite ends of the lens unit 5 and is located between the first and second edges 52, 53.

In step 67, with reference to FIG. 8 and FIG. 9, the lens unit 5 is assembled to the housing unit 3 via the slot 311 in such a manner that the light-sensing axis (Z) passes through the lens unit 5. In this embodiment, an automatic pick-and-place machine (not shown) is used to pick up the lens unit 5, pass the lens unit 5 through the slot 311 in the outer housing 31 along the second direction (Y), and place the lens unit 5 against the wall of the first member 322 defining one side of the groove 321 in the inner support 32 in such a manner that the imaginary second center line (L2) of the lens unit 5 coincides with the imaginary first center line (L1).

In step 68, referring to FIG. 8 and FIG. 10, the lens unit 5 is fixed to the first member 322 of the inner support 32 of the housing unit 3 after step 67 using an adhesive.

In step 69, referring-to FIG. 8 and FIG. 10, the second member 323 of the inner support 32 is inserted into the outer housing 31 through the slot 311, and is fitted to the first member 322, such that the lens unit 5 is disposed in the groove 321 between the first and second members 322, 323.

In step 70, referring to FIG. 8 and FIG. 12, the cover plate 34 is fitted in the slot 311 of the outer housing 31, thereby completing optical alignment and assembly of the optical module.

Referring to FIG. 7-1, FIG. 7-2 and FIG. 12, the $\frac{1}{2}(Z_0)$ position is coincident with the $\frac{1}{2}(TC)$ position in the present invention. Therefore, even with variations in the actual total optical path length (TC') in the hundreds of microns, MTF (%) is maintained close to ideal. That is, the optical alignment and assembly methods of the present invention allows for small variations in positioning between the object position and the light-sensing unit 4, while maintaining good imaging quality. Further, after taking into account the variations in refractive index between the optical module of the present invention and the object position, imaging quality of the optical module is not affected even though the optical path length from the object position (i.e., the top surface 91 of the glass plate 9 in this embodiment) to where the light reaches the lens unit 5 differs from the optical path length from where the light exits the lens unit 5 to the light-sensing component 41 after being focused and refracted.

The optical module, and the optical alignment and assembly methods thereof of the present invention have the following effects and advantages:

1. Only a simple pick-and-place operation is required for the lens unit 5. Hence, a typical surface-mount technology (SMT) pick-and-place machine used for electronic components or semiconductor dice may be used to perform optical alignment and assembly in a very short time of, for example, ten seconds or less. As a result, the number of steps involved in, and the time required for, optical alignment and assembly in the present invention are significantly reduced, thereby reducing manufacturing cost and enhancing productivity.

2. The present invention is capable of realizing an optical system that approaches the theoretical maximum value for MTF (%) regardless of whether small variations in position occur as discussed above. Hence, a high resolution is achieved for the optical system to which the optical module of the present invention is applied. Furthermore, such high quality may be ensured for all the optical modules produced since small positional variations do not (or very minimally) affect optical quality.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An optical alignment method for an optical module that includes a housing unit, a light-sensing unit disposed in the housing unit, and a lens unit for focusing light onto the light-sensing unit, said optical alignment method comprising the steps of:

(a) through image-capturing techniques, finding a light-sensing component of the light-sensing unit and a predetermined object reference point, and determining an actual total optical path length between the light-sensing component and an object position having a predetermined distance relation with the predetermined object reference point;

(b) subtracting a correction optical distance from the actual total optical path length to obtain a corrected total optical path length;

(c) finding an imaginary first center line located at a position that divides the corrected total optical path length into equal half distances;

(d) through image-capturing techniques, finding first and second edges of the lens unit that are opposite to each other in a direction of a light-sensing axis of the light-sensing unit from the light-sensing component to the object position, and determining a lens length between the first and second edges;

(e) finding an imaginary second center line located at a position that divides the lens length into equal half distances; and (f) assembling the lens unit to the housing unit in such a manner that the imaginary second center line coincides with the imaginary first center line.

2. The optical alignment method of claim 1, wherein, in step (a) and step (d), a charge-coupled device is used to perform image capturing.

3. The optical alignment method of claim 1, wherein, in step (a), the predetermined object reference point is provided on the housing unit, and has a predetermined spacing from the object position along the direction of the light-sensing axis, the actual total optical path length between the light-sensing component and the object position being determined by adding the predetermined spacing to a distance between the light-sensing component and the predetermined object reference point.

4. The optical alignment method of claim 3, wherein two of the predetermined object reference points are located respectively on opposite ends of the housing unit, the imaginary first center line intersecting the opposite ends of the housing unit.

5. The optical alignment method as claimed in claim 1, wherein the correction optical distance is to compensate for variations in refractive index between the optical module and the object position.

6. The optical alignment method of claim 1, wherein the imaginary second center line passes through opposite ends of the lens unit and is located between the first and second edges.

7. An optical module, comprising:

a light-sensing unit including at least one light-sensing component that is capable of sensing light along a light-sensing axis;

a housing unit, in which said light-sensing unit is disposed, and which is formed with a slot located on a plane parallel to the light-sensing axis; and a lens unit disposed in said housing unit for focusing light onto said light-sensing component, said lens unit having opposite first and second edges intersected by the light-sensing axis;

wherein said slot in said housing unit permits use of image-capturing techniques to find said light-sensing component and a predetermined object reference point for determining an actual total optical path length between said light-sensing component and an object position having a predetermined distance relation with said predetermined object reference point; and wherein an imaginary first center line located at a position that divides a corrected total optical path length, which is obtained by subtracting a correction optical distance from the actual total optical path length, into equal half distances is coincident with an imaginary second center line located at a position that divides a lens length between said first and second edges of said lens unit into equal half distances.

8. The optical module of claim 7, wherein said housing unit includes an outer housing having said light-sensing unit mounted thereto, and an inner support disposed in said outer housing for supporting said lens unit in said outer housing between said light-sensing unit and the object position.

9. The optical module of claim 8, wherein said housing unit is provided with two of said predetermined object reference points respectively on opposite ends thereof, a predetermined spacing being present between each of said predetermined object reference points and the object position.

10. The optical module of claim 9, wherein said housing unit further includes a pair of fasteners for interconnecting said outer housing and said inner support respectively at opposite ends thereof, each of said predetermined object reference points being located on a respective one of said fasteners.

11. The optical module of claim 8, wherein said slot is formed in one side of said outer housing, and said inner support includes first and second members coupled to one another to define a groove therebetween, said lens unit being inserted in said groove.

12. The optical module of claim 11, wherein said second member of said inner support is coupled detachably to said first member, and is insertable into said outer housing via said slot.

13. The optical module of claim 7, wherein said housing unit further includes a cover plate for covering detachably said slot.

14. The optical module of claim 7, wherein said light-sensing unit includes a linear image sensor serving as said light-sensing component.

15. An assembly method for an optical module that includes a light-sensing unit including a light-sensing component capable of sensing light along a light-sensing axis, a housing unit formed with a slot, and a lens unit having opposite first and second edges, said assembly method comprising the steps of:
  (a) mounting the light-sensing unit in the housing unit such that the slot is on a plane parallel to the light-sensing axis;
  (b) through image-capturing techniques and via the slot in the housing unit, finding the light-sensing component and a predetermined object reference point, and determining an actual total optical path length between the light-sensing component and an object position having a predetermined distance relation with the predetermined object reference point;
  (c) subtracting a correction optical distance from the actual total optical path length to obtain a corrected total optical path length;
  (d) finding an imaginary first center line located at a position that divides the corrected total optical path length into equal half distances;
  (e) through image-capturing techniques, finding the first edge and the second edge of the lens unit, and determining a lens length between the first and second edges;
  (f) finding an imaginary second center line located at a position that divides the lens length into equal half distances; and
  (g) assembling the lens unit to the housing unit via the slot in such a manner that the light-sensing axis passes through the lens unit and that the imaginary second center line coincides with the imaginary first center line.

16. The assembly method of claim 15, further comprising fixing the lens unit to the housing unit after step (g) using an adhesive.

17. The assembly method of claim 15, wherein, in step (g), a pick-and-place machine is used to control placement of the lens unit in the housing unit.

* * * * *